United States Patent [19]

Lorenz

[11] Patent Number: 4,570,438

[45] Date of Patent: Feb. 18, 1986

[54] PULSE-CONTROLLED TURBINE

[76] Inventor: Edmund Lorenz, Badendorf 54, A-8413 St. Georgen a.d. Stiefing, Austria

[21] Appl. No.: 545,138

[22] Filed: Oct. 25, 1983

[30] Foreign Application Priority Data

Oct. 27, 1982 [AT] Austria ................. 3937/82

[51] Int. Cl.[4] ............................................. F02C 5/12
[52] U.S. Cl. ............................ 60/39.39; 60/39.511
[58] Field of Search ............... 60/39.39, 39.38, 39.78, 60/39.79, 39.81, 39.511, 39.8

[56] References Cited

U.S. PATENT DOCUMENTS

| | | |
|---|---|---|
| 2,557,198 | 6/1951 | Nichols . |
| 2,579,321 | 12/1951 | Kadenacy .......................... 60/39.39 |
| 2,923,124 | 2/1960 | Mendez-Llamozas ........ 60/39.78 X |
| 2,928,242 | 3/1960 | Guenther .......................... 60/39.39 |
| 3,362,157 | 1/1968 | Taylor .......................... 60/39.38 X |
| 3,494,127 | 2/1970 | Brille .............................. 60/39.39 X |

FOREIGN PATENT DOCUMENTS 311735 11/1973 Austria .

Primary Examiner—Carlton R. Croyle
Assistant Examiner—Jeffrey A. Simenauer
Attorney, Agent, or Firm—Karl F. Ross; Herbert Dubno

[57] ABSTRACT

A pulse-controlled gas turbine utilizes a nonpositive drive for the valve plate at one side of the combustion chamber and a turbine constructed and arranged to generate suction in the combustion chamber at the other side of the housing to ensure isochore combustion of the air and fuel mixture in the combustion chamber.

18 Claims, 11 Drawing Figures

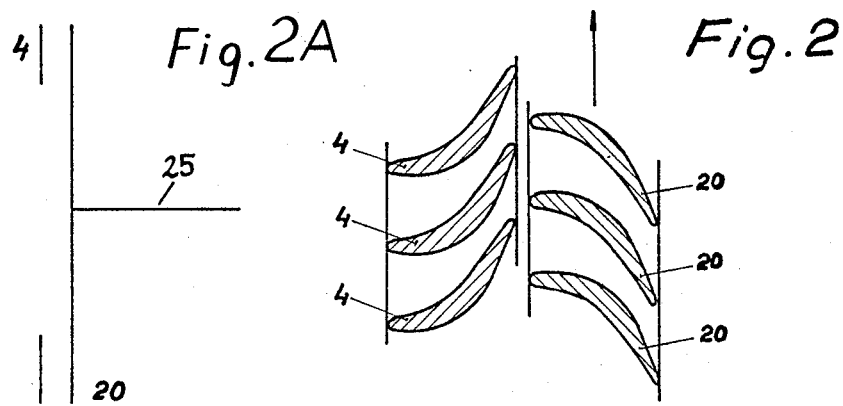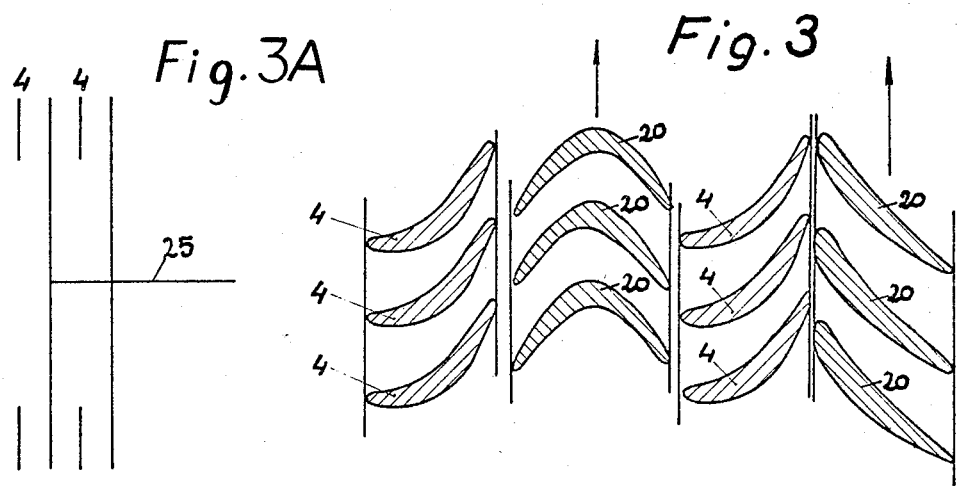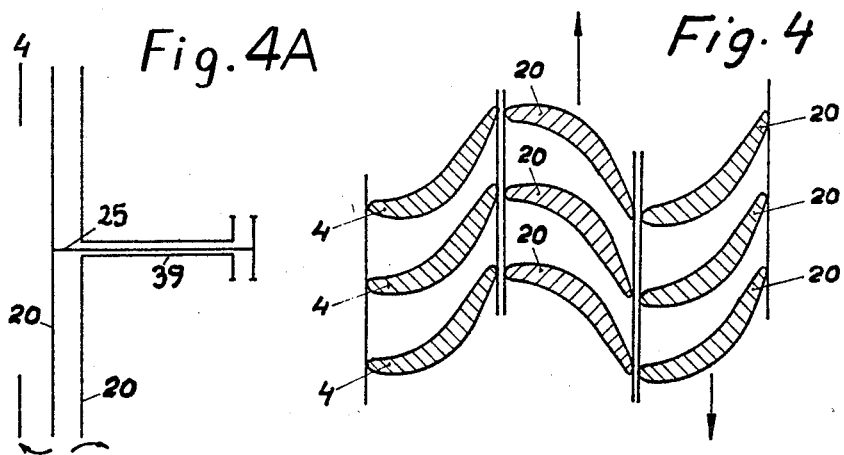

PULSE-CONTROLLED TURBINE

FIELD OF THE INVENTION

My present invention relates to a pulse-controlled turbine and, more particularly, to a turbine of the type in which one or more combustion chambers can be provided with one or more injection nozzles and means for igniting a mixture, generally of a combustible fuel and air, the expansion products of the combustion driving a rotor of the turbine.

BACKGROUND OF THE INVENTION

Such turbines are operated with a cycle in which the phases in succession include charging (of the expansion medium into the combustion chamber), combustion of the injected fuel in the expansion medium which can be air, and expansion of the medium within the chamber. As noted, it is the combustion which is utilized to develop the pressure and energy of the gas propelling the rotor of the turbine.

Such a turbine is known, for example from Austrian Pat. No. 311,735. While, in many respects, the machine described in this publication suffices in many applications, it nevertheless leaves much to be desired.

OBJECTS OF THE INVENTION

It is the principal object of the present invention to provide a combustion gas turbine of greater reliability and efficiency than earlier turbines.

Still another object of this invention is to provide a gas turbine which represents an improvement over the turbine of the aforementioned Austrian patent and combines high efficiency and reliability with a high load capacity.

SUMMARY OF THE INVENTION

These objects and others which will become apparent hereinafter are attained, in accordance with the present invention, in a pulse-controlled turbine engine, i.e. a gas turbine, which comprises at least one combustion chamber, intake means at one end of the combustion chamber for delivering air as a drive medium thereto, means in the combustion chamber for igniting a fuel/air mixture, valve means cooperating with the intake means to selectively block and unblock an opening at this end of the chamber at which the air is introduced; means for injecting fuel into the chamber; a guide/rotor turbine assembly at the opposite end of the chamber including at least one rotor driven by expanding gases from the chamber; and means for generating a pressure in the chamber which is less than the pressure at the opening to induce a flow of the drive medium into the chamber. According to the invention, the assembly and/or the controlled intake and valve system are constructed and arranged to maintain a substantially isochore combustion characteristic in the combustion chamber.

Thus, according to the invention, the present improved system provides a guide/rotor assembly and a controlled intake system which together or severally insure an approximately isochore combustion characteristic while, in addition, a reduced pressure by comparison with the pressure upstream of the intake system is also generated in the combustion chamber to induce the flow of the drive medium into the latter. Preferably a blower is provided to increase the pressure of the air upstream of the intake system and, in accordance with still another feature of the invention, means is provided for the thermal precompression of the drive medium before it enters the combustion chamber. This latter means can include means for after burning the exhaust gases leaving the combustion chamber and a heat exchanger for heating the incoming drive medium or combustion air with the heat produced in the after burning, with residual heat from the combustion gases or both.

Best results are obtained when the intake system includes a pair of plates with mutually alignable or registrable slits which can be offset from one another to control the influx of the air to the combustion chamber, the air being supplied by a blower.

BRIEF DESCRIPTION OF THE DRAWING

The above and other objects, features and advantages of the present invention will become more readily apparent from the following description, reference being made to the accompanying drawing in which:

FIGS. 2–6 are cross-sectional views detailing various gas guide arrangements of the vanes of the rotor and stator of the assembly; and FIGS. 2A–6A are diagrams associated with the respective detail views of FIGS. 2–6 to facilitate understanding of the relationships between the rotor and stator elements of the assemblies of these various embodiments.

SPECIFIC DESCRIPTION

Figure 1:
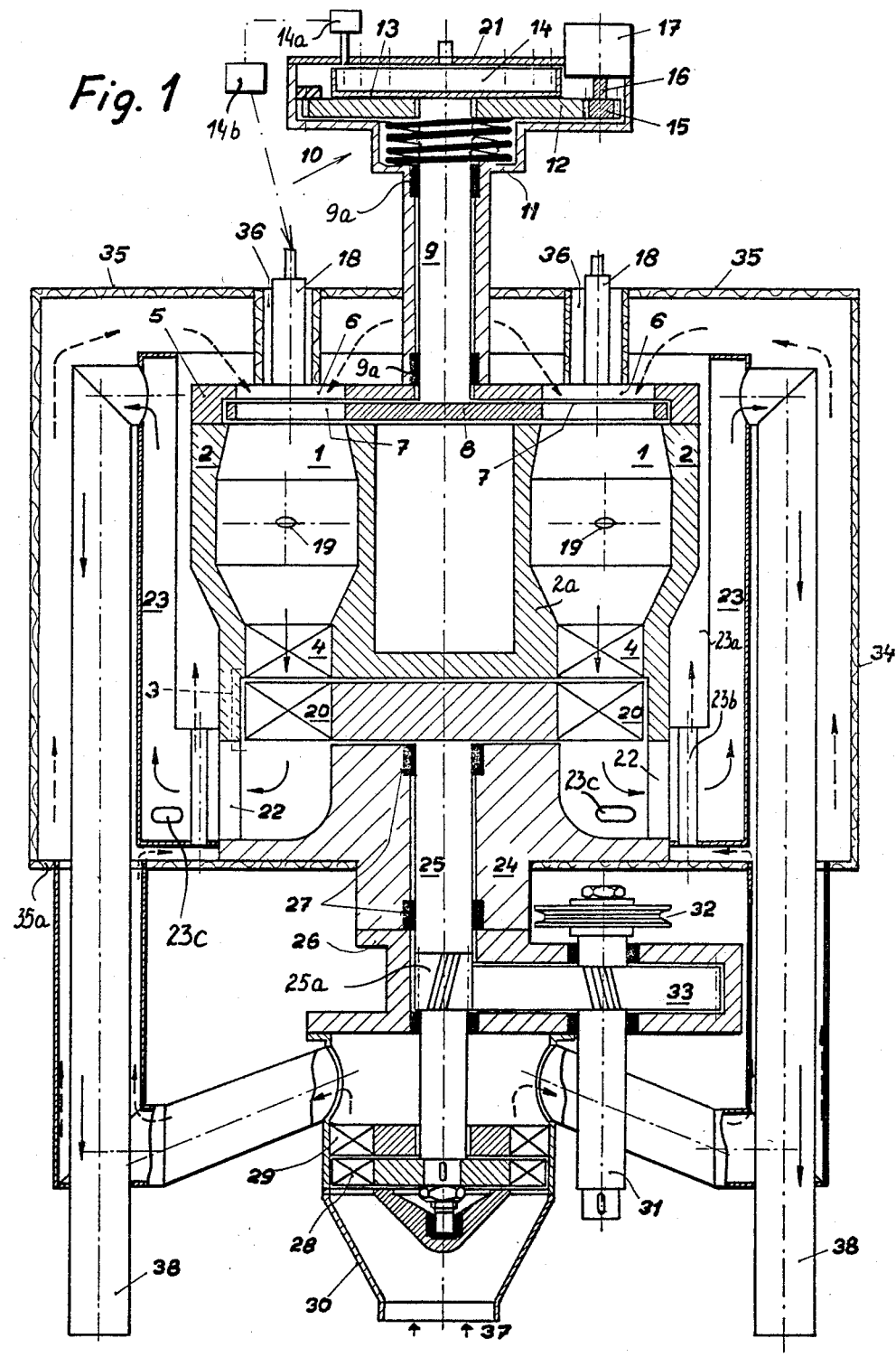
FIG. 1 is an axial cross-sectional view through a pulse-controlled turbine diagrammatically illustrating the invention.

In FIG. 1, two separate combustion chambers 1 are seen to be formed in a hollow generally cylindrical outer shell 2 which, in the embodiment shown, is annular and surrounds a core 2a. A set of guide vanes representing the stator 4 is fixed on the outer shell 2.

At the opposite end of the combustion chambers 1, a stationary valve member 5 is provided, this member having slits and being bolted to the outer shell 2. The slits are represented at 6 and communicate with the combustion chambers 1.

A valve disk lies inwardly of the plate 5 and is also formed with slits 7 which can be aligned with the slits 6, e.g. as in the position shown, or disaligned from the slits 6 so that both the slits 6 and 7 are blocked, thereby closing the upper ends of the combustion chambers 1.

The valve disk 8 is axially displaceable at least limitedly and is fixed to a shaft 9 which extends out of the heat exchanger housing wall 35.

The upper end of the shaft 9 is formed with a friction clutch 10 which comprises the compression spring 11 which coaxially surrounds the shaft 9 and yieldably holds a gear 12 upwardly against an abutment while permitting this gear to rotate. The gear 12 is provided with a friction lining 13 which can engage the underside of a grooved disk 14. The gear 12 meshes with a pinion 15 on a shaft 16 of a variable speed DC electric motor 17 which is fixed to the outer housing 21 of the friction clutch 10.

Consequently, should the valve disk 8 be forced upwardly against the spring force which is applied downwardly to disk 9b of shaft 9, the shaft 9 thereof would entrain the grooved disk 14 which is attached to the shaft upwardly and temporarily disengage this disk from the friction lining 13. Valve disk 8 moves only within the small clearances shown between the valve disk and the outer shell 2 and the stationary valve means 5.

The grooved disk 14 cooperates with timing detectors, one of which is represented at 14a working into a microprocessor-based controller 14b which can control the injection of fuel as represented by dot dash lines and, where pertinent, the firing of a spark plug or the like. Seals 9a are provided around the shaft 9 to seal the heat exchanger chamber against escape of gases.

The plate 5 also carries four electronically controlled injection nozzles 18 which are cooled by a cooling medium, the injection signals being derived from the controller 14b.

In the outer combustion chamber shell 2, either glow plugs or spark plugs 19 are mounted to ignite the fuel-/air mixture when the fuel is injected. This ignition means projects into the combustion chamber 1.

Below the gas guide arrangement 4, the rotor vanes 20 are provided. After traversing the rotor, the expansion gases are directed through radially oriented openings 22 which are formed in the outer shell 2 and open into the after burning compartment 23 which surrounds the shell 2.

The turbine rotor or wheel 20 is fixed to one end of a shaft 25 which is journaled via labyrinth seals 27 in a journal flange 24 to which the transmission housing 26 is flanged.

The shaft 25 is provided with a pinion 25a which meshes with the gear 33.

More specifically, the transmission housing 26 can be provided with a driven shaft 31 with a gear 33 meshing with the pinion 25a and carrying, in turn, a V-belt pulley 32. A V-belt extending around this pulley can be connected to another shaft, e.g. the shaft of a starter via a starter release clutch or other means for automatically disconnecting the starter motor once the gas turbine engine is in operation. The starter shaft can be, as is conventional, provided with a second V-belt pulley which can be utilized, in turn, to drive the generator or alternator for generating electric power for the engine system and any vehicle in which the engine of the invention may be provided.

The turbine housing is a double-wall heat exchanger formed with an outer shell 34 which is closed at one end by the wall 35.

The latter wall is provided with sealed openings 36 for the electronically controlled injection nozzles 18 and for the shaft 9 of the friction clutch 10.

The flow direction of air to the combustion chamber 1 is shown by a broken-line arrows and the flow of expansion and exhaust gases by solid line arrows in FIG. 1.

As will be apparent from FIG. 1, therefore, cold air is drawn in at 37 and can be heated in part in a counter flow process (by passing along the exhaust pipes 38) and in part in a unidirectional flow process (by passing through heat exchanger portion 23a via tubes 23b) before entering the combustion chambers 1, the gases leaving the combustion chambers 1 after combustion in the chamber 23, being discharged from the exhaust pipes 38.

At the end of the shaft 25, a rotor 28 is mounted which cooperates with a stator 29 to form a blower driven by the shaft 25 and inducing the air flow through the intake cowling 30. The lower end of shaft 31 can be connected to any additional transmission for driving any load, e.g. the transmission of an automotive vehicle.

The wall of the internal housing 23 can be provided, as represented at 23c with sealed and insulated openings for after-burning spark plugs or glow plugs which can project into the heat exchanger chamber 23 and serve to ignite the exhaust gases emerging from the combustion chamber.

In addition, although not shown, insulated openings can be provided for temperature sensors which electronically detect the temperature state of the turbine and provide inputs to the controller 14b which may be a microprocessor based controller.

The rear wall of the heat exchanger as shown at 35a can be provided with openings for the exhaust pipes 38 and the tubes which surround them for the passage of the combustion air in heat exchange relationship to the exhaust gas. These pipes and tubes can, of course, be flanged to appropriate fittings or to the housing in the usual manner.

It is important that the turbine set or assembly, i.e. the arrangement of the stator or guide vanes and the rotor vanes be such that the pressure differential thereacross upon the expansion of gases in the combustion chamber will be transformed into rotation and torque at the shaft 25, but also that subsequent to the expansion stage, an aftersuction or reduced pressure is generated in the combustion chamber to assist in drawing the expansion air into the latter. This can be achieved by axial or radial or axial-radial or semiradial vane combinations.

The advantages of such arrangements are several. Firstly, they permit greater machine efficiency. Secondly, they facilitate filling the combustion chamber because the suction effect generated in the combustion chamber overcomes the heat barrier or damming effect which might otherwise resist introduction of air into the combustion chamber. Thirdly a constant reduction of pressure in the combustion chamber to a given reduced pressure or subatmospheric pressure is important for the nonpositive control of the combustion processes according to the invention.

In FIG. 2, for example, in a first combination where the rotor vanes 20 lie downstream of the stator vanes 4 and are oriented in the manner illustrated, the generated pressure differential by expansion of the gases in the combustion chamber sets the rotor vanes in rotation in the direction shown by the arrow but because of the special configuration of these vanes, continued rotation of the rotor after the pressure differential terminates, generates suction by an impeller effect which reduces the pressure in the combustion chamber below atmospheric, i.e. below the intake pressure at 37.

In the combination of FIG. 3, the rotor consists of two sets of vanes 20 interdigitated with two sets of stator vanes 4 on a common shaft 25. The first set of vanes forms a uniform pressure wheel while the second forms a reaction wheel. Both wheels participate in driving the rotor upon expansion of gases but the first wheel also generates suction when the pressure differential caused by the expansion terminates. In the combination shown in FIG. 4, the two rotor wheels are mounted on respective shafts. The first wheel is mounted on the shaft 25 while the second wheel can be mounted on a hollow shaft 39 surrounding the shaft 25 and having its pinion connected to the main shaft 25 by planetary gearing to contribute torque to the shaft 25.

This arrangement utilizing a single set of guide vanes 4 insures an augmented suction effect. Preferably the two wheels have different numbers of vanes and directly follow one another.

Figure 5A:
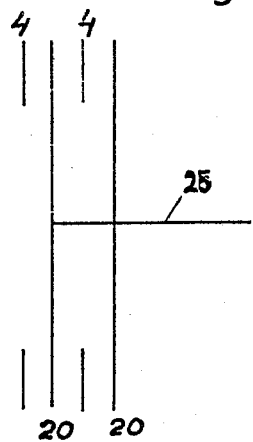
Figure 5:
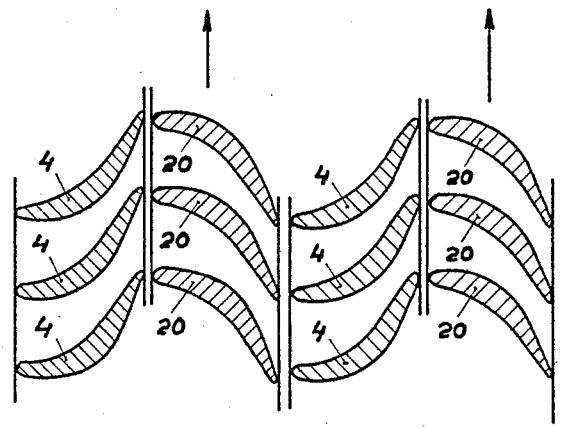

A fourth combination shown in FIGS. 5 and 5A retains the enhanced suction effect of the embodiment of FIGS. 4 and 4A but utilizes a second set of stator vanes for the second wheel and allows the second wheel to be mounted directly upon the shaft 25 so that the hollow shaft and any coupling transmission can be avoided.

Figure 6A:
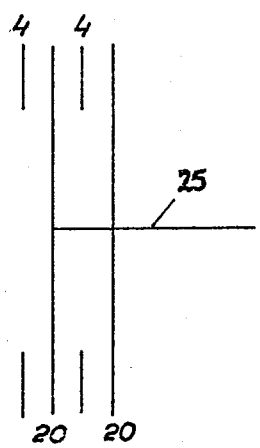
Figure 6:
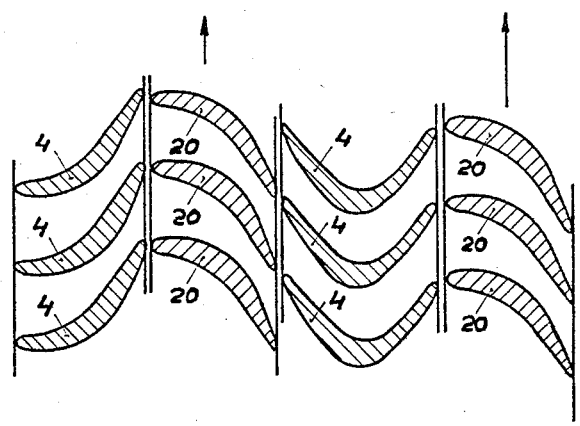

Finally, the fifth combination of FIGS. 6 and 6A utilizes equal pressure vanes for the second set of vanes 4 but maintains the configuration of the rotor vanes 20 as illustrated in FIGS. 5 and 5A so that the effects of FIGS. 5 and 3 are combined in the generation of suction.

The turbine of the present invention is a pulse-controlled gas turbine with an approximately isochore combustion characteristic.

The pulse control differs from the control of conventional gas turbines and combustion engines in that it is not positively timed and this effect depends, of course, upon the ability of the turbine assembly to generate a suction within the combustion chamber as well as upon the unique intake system which decouples the valve from the valve drive arrangement as will be described in greater detail below. In addition, the compression of the air within the heat exchanger and at least in part the increase in pressure resulting from the transfer of heat thereto by after combustion and heat exchange from the exhaust gases, referred to hereinafter as thermal precompression, greatly facilitates the gas transfer of the air into the combustion chambers. The mass transfer is, of course, facilitated by the coupling of the blower to the output shaft.

The intake system is thus completely new and provides for charging the combustion chamber, injection, ignition and expansion, and after suction with nonpositive control in a period of milliseconds. The term "nonpositive control" is used herein to indicate that the valve arrangement and the electronic system for triggering operation of the injectors and the spark plugs, if the latter is provided, is decoupled intermittently from the timing drive.

The intake system thus utilizes a rotary valve disk 8 whose slits 7 can register or be offset from the slits 6 in a stationary plate of member 5. These slits, when they register, admit the thermally and mechanically precompressed air into the combustion chamber and when they are offset, block the flow of the air into the combustion chamber. During the period in which flow is blocked, the thermal compression takes place because the air continuously is forced into the heat exchanger and is subjected to heating therein. Via the shaft 9, this disk 8 is connected to the friction clutch 10 and is driven by the motor 17 via the gear 15 which meshes with the gear 12 when the gear 12 is frictionally engaged with the grooved disk 14 via the lining 13. The motor 17, at variable speed but sufficient to provide the millisecond response desired, rotates the wheel 14 and the plate 8 until the slits are disaligned and the chamber closed. The grooved disk 14 via the sensor 14a triggers injection of the fuel and combustion and the explosion drives the plate 8 axially to disengage the clutch at 13, allowing the motor 17 to continue to rotate the gear 12 but decoupling it from the grooved disk 14. During the explosion and expansion step, therefore, the shaft 9 and the plate 8 are immobilized briefly. The expansion is effected isochorically and the expansion gases drive the turbine. As soon as the pressure falls, the plate 8 is again frictionally coupled with the gear 12, the valve slits open to permit the influx of air and during the intervening period a suction has been generated in the combustion chamber by the turbine assembly. Instead of a motor 17, a drive from the turbine shaft 25 can be used to rotate the gear 12. While the injection and ignition signals are preferably given by the electronic controller, although acoustical, mechanical, pneumatic, optical or a combination of such means may be used for the contactless pick up of the trigger signals from the grooved disk 14 and the generation of the pulses for ignition and injection. The power output and torque of the engine are tapped from the lower end of shaft 31.

The after combustion in chamber 23 will be minimal once the machine has been in operation for some time since practically all of the fuel burns fully in the combustion chamber. However during starting operations when large proportions of combustible gases are found in the exhaust, the after combustion serves to reduce detrimental emissions while contributing the heat value of such combustibles to the incoming air.

The blower or precompressor which operates as an axial, radial or combination blower not only serves to deliver the air with a slight super-atmospheric pressure to the heat exchanger but insures that the air will pass along the heat exchange surfaces at an elevated pressure, thereby increasing the heat exchange effectiveness. When the valve formed by the plate 8 is closed, of course, the compression is effective against the body of air previously introduced into the heat exchanger and hence this body of thermally precompressed air forms a valve against which the air can be compressed.

Since the periodicity of the engine is in part a function of the natural conditions of expansion in the expansion chamber, the engine has a periodic operation without having its timing positively driven.

Obviously, the combustion chamber 1 can be subdivided into a number of combustion chambers having respective intake systems which may be individually decoupled from a common timing drive in the manner described.

The use of an electric motor to drive the timing wheel 14 via the clutch, permits the entire engine to be of a smaller size than conventional engines with a positive timing drive coupled with the output shaft and facilitates electronic control of the engine to optimize operating parameters. To this end, the motor 14 may be a stepping motor operated by the electronic controller 14b.

The regenerative heat exchanger effect of the present invention also markedly increases efficiency while the indirect timing coupled with the suction after effect in the combustion chamber ensures more complete combustion than has been possible with earlier engines. The environmental compatibility of the engine of the invention is thus clear. The fuels which may be used include kerosene, gasoline, diesel oil, other petroleum fractions, methanol, ethanol, methane and even flue gases.

I claim:

1. A pulse-controlled gas turbine engine comprising: means defining at least one combustion chamber; intake means at one side of said chamber including valve means for selectively admitting air for combustion of a medium to said chamber and blocking the escape of said air from said chamber at said side;
means for igniting the medium in said air in said chamber to effect combustion of said medium in said air and generate gases in said chamber, turbine means at another side of said chamber including guide vanes and rotor vanes and including a rotor driven by expanding gases resulting from combustion in said chamber;

drive means for said valve means for effecting cyclically in succession the introduction of said medium into said chamber, the combustion of said medium in said chamber and the expansion and discharge of gases through said turbine means; and means for decoupling said drive means from said valve means automatically upon said expansion whereby said intake means and said turbine means ensure that said combustion is effected substantially isochorically.

2. The engine defined in claim 1 wherein the means defining said combustion chamber defines a plurality of combustion chambers each having a respective intake means.

3. The engine defined in claim 1, further comprising means for thermally precompressing said medium before introducing it into said chamber.

4. The engine defined in claim 3 wherein the means for thermally precompressing said medium includes means for passing exhaust gases from said chamber in heat exchanging relationship with said medium and means for afterburning said exhaust gases.

5. The engine defined in claim 1 wherein said turbine means includes means for inducing a suction in said chamber following the expansion.

6. The engine defined in claim 5 wherein said stator vanes form a ring of stator vanes and said rotor vanes form a ring of rotor vanes axially juxtaposed with said ring of stator vanes, said ring of rotor vanes being oriented to induce suction in said chamber.

7. The engine defined in claim 6 wherein said turbine means includes at least two rings of rotor vanes on separate rotors axially juxtaposed with one another and having different numbers of rotor vanes, one of said rotors being carried on a shaft coaxial with a shaft of the other rotor.

8. The engine defined in claim 1 wherein said valve means includes a movable valve plate having slits adapted to register selectively with slits in another plate.

9. The engine defined in claim 1 wherein said decoupling means includes a friction clutch between said drive means and said valve means.

10. The engine defined in claim 1 wherein said rotor is connected to a blower for blowing air into said chamber to serve as said medium.

11. The engine defined in claim 1 wherein said valve means is provided with a rotary timing member connected to a contactless sensor for initiating the combustion and including means for generating impulses controlling fuel injection interval, fuel injection point and ignition point.

12. The engine defined in claim 11 wherein said rotor means is provided with fuel injectors.

13. The engine defined in claim 1 wherein said combustion chamber is provided with ignition means projecting into said combustion chamber for igniting said medium.

14. A pulse controlled gas turbine engine comprising:

a generally cylindrical housing defining at least one combustion chamber open at opposite ends of said housing;

a valve plate rotatably mounted at one end of said housing and formed with slits cooperating with slits in another plate to effect communication between a space surrounding said housing and said combustion chamber in an aligned orientation of said slits and blocking flow of combustion air to and of combustion gases from said chamber at said one end in a position of said valve plate in which the slits of said plates are offset from one another;

a shaft carried by said valve plate, said valve plate being axially displaceable with said shaft relative to said housing;

a timing wheel mounted on said shaft and constructed and arranged to trigger timing pulses for initiating injection of fuel into said chamber and combustion thereof in said chamber with said combustion air to form said combustion gases;

a turbine assembly at the opposite end of said housing including a rotor driven by expanding gases from said chamber;

a drive wheel rotatable relative to said shaft and provided with a drive adapted to rotate said drive wheel substantially continuously; and a clutch connecting said drive wheel to said shaft and effective upon axial displacement of said valve plate upon explosion in said chamber to decouple said shaft from said wheel and temporarily immobilize said valve plate for the generation of pressure in said chamber while said drive means continues to rotate said wheel, said clutch automatically recovering said wheel with said shaft upon decrease in pressure in said chamber.

15. The engine defined in claim 14, further comprising a heat exchanger surrounding said housing and forming said space, said housing opening into said heat exchanger at said other end downstream of said turbine assembly, said heat exchanger being provided with means for afterburning exhaust gases from said combustion chamber, and with means for passing combustion air through said heat exchanger in a heat-exchanging relationship with said exhaust gas before said air is admitted to said chamber through said valve plate, said other plate being provided with at least one fuel injector controlled in response to the position of said timing wheel for injecting fuel into said chamber.

16. The engine defined in claim 15 wherein exhaust pipes extend from said heat exchanger, said rotor being provided with a rotor shaft, said rotor shaft carrying a blower, said blower feeding air into a jacket for said exhaust pipe.

17. The engine defined in claim 16 wherein said rotor shaft has a gear meshing with a driven gear of another shaft connected to a stator for the engine at one end having another end forming a power output for said engine, said turbine assembly being constructed and arranged to generate suction in said chamber following expansion of gases therefrom.

18. The engine defined in claim 17 wherein said drive includes an electric motor, connected by a pinion gear to said drive wheel and said drive wheel is juxtaposed with said timing wheel, said clutch including a friction lining on at least one of the juxtaposed surfaces of said wheels.

* * * * *